US006076278A

United States Patent [19]

Bradley

[11] Patent Number: 6,076,278

[45] Date of Patent: Jun. 20, 2000

[54] METHODS OF DRYING PIPELINES

[75] Inventor: Gary W. Bradley, Duncan, Okla.

[73] Assignee: Halliburton Energy Services, Inc., Duncan, Okla.

[21] Appl. No.: 08/993,920

[22] Filed: Dec. 18, 1997

[51] Int. Cl.$^{7}$ .................................. F23B 3/00; C09K 3/00; B01D 47/00

[52] U.S. Cl. .............................. 34/329; 95/153; 166/310; 252/194; 507/90; 510/188; 585/15

[58] Field of Search ............................ 252/194; 510/188, 510/411; 34/329, 341; 95/153; 134/22.14; 585/15; 507/90; 166/310

[56] References Cited

U.S. PATENT DOCUMENTS

| | | | |
|---|---|---|---|
| 1,510,739 | 10/1924 | Cook | 252/194 X |
| 3,096,383 | 7/1963 | Hann | 585/15 X |
| 3,728,269 | 4/1973 | Stephenson et al. | 510/411 X |
| 3,864,102 | 2/1975 | Powers | 55/30 |
| 4,169,807 | 10/1979 | Zuber | 34/341 |
| 4,346,726 | 8/1982 | Bayen et al. | 137/15 |
| 5,244,878 | 9/1993 | Sugier et al. | 507/90 |
| 5,331,105 | 7/1994 | Duncum et al. | 585/800 |
| 5,351,756 | 10/1994 | Minkkinen et al. | 166/310 X |
| 5,426,258 | 6/1995 | Thomas et al. | 585/15 |
| 5,432,292 | 7/1995 | Sloan, Jr. | 585/15 |
| 5,491,269 | 2/1996 | Colle et al. | 585/15 |
| 5,789,635 | 8/1998 | Durand et al. | 585/15 |

FOREIGN PATENT DOCUMENTS

| | | | |
|---|---|---|---|
| 1007711 | 3/1983 | U.S.S.R. | 252/194 |

*Primary Examiner*—Richard D. Lovering
*Attorney, Agent, or Firm*—Robert A. Kent

[57] ABSTRACT

The present invention provides improved methods of drying pipelines containing water which are to transport hydrate forming gaseous fluids. The methods basically comprise flowing a liquid which forms an azeotrope mixture with water into contact with water in a pipeline, the amount of the azeotropic liquid being sufficient to form an azeotrope mixture with the water whereby as the mixture is evaporated in the pipeline, the water concentration in the remaining mixture does not reach that concentration which will form hydrates with the hydrate forming gaseous fluid.

20 Claims, No Drawings

METHODS OF DRYING PIPELINES

BACKGROUND OF THE INVENTION

1. Field of the Invention.

The present invention relates to improved methods of drying pipelines containing water which are to transport hydrate forming gaseous fluids.

2. Description of the Prior Art.

After a pipeline for the transportation of light hydrocarbons such as natural gas has been repaired or constructed and hydro-tested or otherwise exposed to water, it is mandatory that water remaining in the pipeline be removed. The reason for this is that light hydrocarbon gases form hydrates with water which can and often do reduce or block the flow of gases through pipelines.

Gas hydrates are similar to ice crystals and form by the combination of light hydrocarbon gases and water under certain temperature and pressure conditions. The pipelines have heretofore been dried by passing a water absorbing gas such as dry air or nitrogen through the pipeline, by pulling a vacuum on the pipeline, by passing methanol through the pipeline or by a combination of the foregoing techniques. A successful procedure for drying a pipeline which has been used heretofore is to pass methanol through the pipeline.

The methanol is usually separated in stages by pipeline pigs which allows the water in the pipeline to be exposed to successive methanol contact which brings about successive dilutions of the methanol-water mixture remaining in the pipeline. Such methanol treatments have resulted in films of methanol-water mixtures remaining in pipelines containing very small amounts of water. However, even very small amounts of water may be sufficient to cause hydrate formation in very long, cold pipelines. For example, a 24 inch pipeline which is about 700 miles long will be left with a film of methanol and water mixture on its inside surfaces after a methanol pigging treatment of the type described above. Assuming the film to be about 0.1 millimeter thick, the total volume of the methanol-water mixture left in the pipeline is about 7,700 cubic feet of liquid, most of which is methanol. However, a property of methanol-water mixtures is that the methanol evaporates faster than the water. Thus, as evaporation of the methanol-water mixture left in the pipeline takes place over time, the mixture constantly increases in water concentration. Accordingly, there is a possibility that the methanol will be stripped from the mixture remaining in the pipeline leaving the mixture containing a high concentration of water which can cause the formation of hydrates in the pipeline.

Thus, there is a need for improved methods of drying pipelines containing water which are to transport hydrate forming gaseous fluid.

SUMMARY OF THE INVENTION

The present invention provides improved methods of drying pipelines containing water which are to transport hydrate forming gaseous fluids which meet the need described above and overcome the deficiencies of the prior art. The methods of the invention basically comprise the steps of flowing a liquid which forms an azeotrope mixture with water into contact with the water in a pipeline. The amount of the azeotrope mixture forming liquid utilized is sufficient to form an azeotrope mixture with the water whereby as the mixture is evaporated in the pipeline, the water concentration in the remaining mixture does not approach that concentration which will form hydrates with the hydrate forming gaseous fluid. Thereafter, the hydrate forming gaseous fluid is flowed through the pipeline.

Examples of azeotrope mixture forming liquids which can be utilized include, but are not limited to, compounds selected from the group of ethanol, n-propanol, isopropanol, tert-butyl alcohol, isopropyl ether, ethyl acetate, methyl ethyl ketone and other similar azeotropic liquids. Generally, azeotropic liquid alcohols are preferred with ethanol being the most preferred. Azeotrope mixtures formed by such azeotropic liquids with water in the pipeline readily evaporate at a constant ratio of azeotropic liquid to water. Further, the presence of an azeotropic liquid alcohol in the remaining unevaporated mixture depresses the temperature at which hydrates will form with the water in the mixture. Thus, by ensuring that the amount of water in the azeotrope mixture initially remaining in the pipeline is low, the evaporation of the mixture will not result in a high enough ratio of water to form hydrates with the hydrate forming gaseous fluid flowing through the pipeline.

Thus, it is a general object of the present invention to provide improved methods of drying pipelines.

A further object of the present invention is the provision of improved methods of drying pipelines whereby the possibility of sufficient water remaining in the pipeline to form hydrates is eliminated.

Other and further objects, features and advantages of the present invention will be readily apparent to those skilled in the art upon a reading of the description of preferred embodiments which follow.

DESCRIPTION OF PREFERRED EMBODIMENTS

The transportation of light hydrocarbons through pipelines containing hydro-test and/or other water requires that the pipelines be free of water to ensure that the hydrocarbons do not form hydrates. Additionally, acid gases in the stream of light hydrocarbons such as carbon dioxide and hydrogen sulfide will dissolve in the water thereby producing corrosive acids in the pipelines.

By the present invention, improved methods of drying newly constructed or other pipelines containing water which are to transport hydrate forming gaseous fluids are provided which eliminate the possibility that water will remain in the pipelines in a condition such that gas hydrates can be formed. The methods of the invention are basically comprised of the following steps. A liquid which forms an azeotrope mixture with water is flowed (hereinafter referred to as an "azeotropic liquid") into contact with the water in the pipeline. The amount of the azeotropic liquid utilized is such that an azeotrope mixture is formed containing sufficient azeotropic liquid to ensure that as the mixture is evaporated in the pipeline, the water concentration in the remaining mixture cannot approach that concentration which will subsequently form hydrates with a hydrate forming gaseous fluid flowing through the pipeline at the conditions existing in the pipeline. Thereafter, the hydrate forming gaseous fluid to be transported by the pipeline is flowed therethrough.

Certain azeotropic liquid compounds form azeotrope mixtures with water. Such an azeotrope mixture behaves like a single substance in that when the mixture is evaporated the vapor produced has the same composition as the liquid. Thus, by forming an azeotrope mixture with water in a pipeline and ensuring that there is enough of the azeotropic liquid present in the mixture as the mixture evaporates to prevent the formation of hydrates with a hydrate forming gas stream at the most favorable conditions for hydrate formation that can exist in the pipeline, the possibility of hydrate formation in the pipeline is eliminated. Thus, in accordance with the drying treatment methods of the present invention, the amount of the azeotropic liquid flowed into contact with water in a pipeline is an amount sufficient to form an azeotrope mixture with the water whereby as the azeotrope mixture remaining in the pipeline after the treatment is evaporated, the concentration of water in the mixture does not approach that concentration which will form hydrates.

Various azeotropic liquids can be utilized in accordance with the present invention including, but not limited to, ethanol, n-propanol, isopropanol, tert-butyl alcohol, isopropyl ether, ethyl acetate, methyl ethyl ketone and other similar azeotropic liquids. Azeotropic liquid alcohols are preferred in that the presence of an alcohol in admixture with water depresses the temperature at which the water will combine with hydrate forming gases to form hydrates. Suitable azeotrope mixture forming alcohols for use in accordance with the present invention include, but are not limited to ethanol, n-propanol, isopropanol and tert-butyl alcohol. Of these, ethanol, isopropanol and tert-butyl alcohol are preferred with ethanol being the most preferred.

In carrying out the methods of the present invention, it is generally preferred that the azeotropic liquid utilized is combined with the water in a pipeline to be dried in an amount such that water is present in the azeotrope mixture remaining in the pipeline in a low amount, e.g., below about 5% by weight when the azeotropic liquid is ethanol, n-propanol or isopropyl ether; below about 12% by weight when the azeotropic liquid is isopropyl alcohol; and below about 6% by weight when the azeotropic liquid is ethyl acetate. As mentioned, after the pipeline drying operation is complete and the hydrate forming gas stream is flowing therethrough, the azeotrope mixture which remains in the pipeline evaporates in a manner whereby the water in the azeotropic mixture stays at the same concentration. The maximum amount of water that can be tolerated in a specific residual azeotrope mixture is that amount whereby the mixture does not form gas hydrates at the most favorable conditions that will exist in the pipeline for the formation of hydrates. As mentioned above, azeotropic liquid alcohols are preferred because they depress the temperature at which hydrates form. Also, it has been found that azeotrope mixtures of alcohol and water dry faster than the non-azeotrope mixture of methanol and water.

A preferred technique for flowing the azeotropic liquid used into contact with water in a pipeline is to flow the liquid through the pipeline in stages separated by a one or more pipeline pigs. The pigs are propelled through the pipeline by a high pressure stream of non-hydrate forming gas such as air, nitrogen or an available process gas. Preferably, the stream of non-hydrate forming gas is air, nitrogen or a process gas which has been dried or otherwise has capacity for absorbing water as the gas flows through the pipeline.

A particularly preferred method of the present invention for drying a pipeline containing water which is to transport a hydrate forming gaseous fluid is comprised of the following steps. Ethanol is flowed into contact with water in the pipeline in stages separated by a plurality of pipeline pigs, the amount of the ethanol being such that the resulting residual azeotrope mixture remaining in the pipeline after the drying treatment has been completed contains water in an amount in the range of from about 1% or less to about 5% water by weight of the mixture. As a result, when the hydrate forming gaseous fluid, e.g., natural gas, is flowed through the pipeline, the presence of the ethanol with the water in the remaining azeotrope mixture depresses the temperature at which hydrates can be formed to a very low level, far below the lowest temperature at which the pipeline will be operated.

In order to further illustrate the methods of the present invention the following examples are given.

EXAMPLE 1

Tests were performed by placing quantities of a mixture of alcohol and water containing 99% methanol and 1% water by weight or an azeotropic mixture of alcohol and water containing 99% ethanol and 1% water by weight in a test apparatus. Dry nitrogen was passed through the apparatus and the dew points of the exiting nitrogen were recorded. During each test, samples of the test alcohol-water mixtures remaining in the apparatus were periodically withdrawn and analyzed for water content. The nitrogen utilized in the test was evaporated liquid nitrogen at ambient temperature, i.e., approximately 23° C., having a dew point of about −90° C. The nitrogen flow rate through the test apparatus was five standard liters per minute at atmospheric pressure. The volume of each test mixture placed in the apparatus was 200 milliliters. The results of these tests are set forth in Table I below.

TABLE I

WATER CONTENTS OF EVAPORATING 99% ALCOHOL-1% WATER MIXTURES

| | Ethanol-Water Mixture | | Methanol-Water Mixture | |
|---|---|---|---|---|
| Elapsed Time, hr:min | Dew Point, ° C. | Water In Remaining Mixture, % by Wt. | Dew Point ° C. | Water In Remaining Mixture, % by wt. |
| 0:00 | −4.7 | 1.35 | 13.2 | 1.33 |
| 0:30 | −2.7 | | 10.4 | |
| 1:00 | −3.6 | 1.48 | 9.5 | 1.58 |
| 1:30 | −4.2 | | 9.3 | |
| 2:00 | −4.4 | 1.58 | 9.2 | 2.35 |
| 2:30 | −5.3 | | 9.1 | |
| 3:00 | −5.7 | 1.88 | 10.0 | 5.73 |
| 3:30 | −6.2 | | ≦−70.0[1] | |
| 4:00 | −7.1 | 1.09 | | |
| 4:30 | −25.3 | | | |
| 4:50 | ≦−70.0[1] | | | |

[1]Dew point measuring instrument would not read dewpoints below −70° C.

From Table I it can be seen that the methanol water mixture increased in water content as the mixture was evaporated by the nitrogen, i.e., the mixture changed from about 1% water to nearly 6% water. This is contrasted with the azeotrope mixture of ethanol and water which remained about the same throughout the test.

EXAMPLE 2

The test procedure described in Example 1 was repeated utilizing three alcohol-water mixtures, namely, a mixture of 95% ethanol and 5% water, a mixture of 95% isopropanol and 5% water and a mixture of 95% methanol and 5% water. The results of the tests are shown in Table II below.

TABLE II

WATER CONTENTS OF EVAPORATING 95% ALCOHOL-5% WATER MIXTURES

| Elapsed Time, hr:min | Ethanol Water: Dew Pt. ° C. | Ethanol Water: Water in Mixture left, % by wt. | Isopropanol-Water: Dew Pt., ° C. | Isopropanol-Water: Water in Mixture left, % by wt. | Methanol-Water: Dew Pt., ° C. | Methanol-Water: Water in Mixture left, % by wt. |
|---|---|---|---|---|---|---|
| 0:00 | 3 | 6.07 | 2.1 | 6.02 | 12 | 6.45 |
| 0:30 | 1.1 | | −2.9 | | 9.2 | |
| 1:00 | 0 | 5.98 | −5.1 | 5.54 | 8.3 | 8.34 |
| 1:30 | −0.2 | | −5.9 | | 8.3 | |
| 2:00 | −0.3 | 6.2 | −7.7 | 4.33 | 8.7 | 9.23 |
| 2:30 | −0.4 | | −9.6 | | 9.1 | |
| 3:00 | −0.6 | 5.75 | −12.1 | 3.04 | 9.6 | 12.56 |
| 3:30 | −1.5 | | −16.1 | | 10.2 | |
| 4:00 | −3.1 | 5.66 | −20.8 | 2.91 | 5.4 | 21.05 |
| 4:30 | −15.8 | | −44.6 | | ≦−70.0[1] | |
| 4:50 | ≦−70.0[1] | 8.46 | ≦−70.1[1] | 1.96 | | |

[1]Dew point measuring instrument would not read dewpoints below −70°.

From Table II it can be seen that the methanol-water mixture increased in water content from a beginning value of about 6.5% by weight to a final value of about 21% by weight. This is very close to hydrate forming conditions for methanol-water mixtures. For example, at natural gas pressures and temperatures of about 2,000 psig and 4° C., hydrates will form with a 75% methanol-25% water by weight mixture.

The water content of the ethanol-water azeotrope mixture showed a slight increase from about 6% to about 8.5% by weight. The isopropanol-water azeotrope mixture showed a decreasing water concentration in the residual mixture as the solution was evaporated.

EXAMPLE 3

The test apparatus described in Example 1 was modified to include a chilled section to determine the affect of cooling the gas stream, i.e., to determine if evaporated liquid would condense. The test mixture described in Example 2 were retested to determine the time required to completely dry the mixtures. The results of these tests are set forth in Table III.

TABLE III

DRYING TIMES FOR 99% ALCOHOL-1% WATER MIXTURES

| Elapsed Time, hr:min | Methanol-Water Dew Point, ° C. | Ethanol-Water Dew Point, ° C. | Isopropanol-Water Dew Point, ° C. |
|---|---|---|---|
| 0:00 | 14:3 | 12.4 | 10.4 |
| 0:30 | 13.5 | −2.2 | −6.9 |
| 1:00 | 13.1 | −3.2 | −6.1 |
| 1:30 | 13.1 | −3.2 | −6.1 |
| 2:00 | 13.3 | −3.2 | −7.7 |
| 2:30 | 13.5 | −3.4 | −10.6 |
| 3:00 | 13.6 | −3.7 | −12.4 |
| 3:30 | 13.7 | −3.9 | −14.7 |
| 4:00 | 14.0 | −4.4 | −17.9 |
| 4:30 | 14.2 | −4.9 | −22.1 |
| 5:00 | 13.4 | −5.3 | −30.2 |
| 5:30 | 9.1 | −5.9 | ≦−70.0[1] |
| 6:00 | 6.7 | −7.0 | |
| 6:30 | 1.6 | −8.0 | |
| 7:00 | −3.7 | −9.6 | |
| 7:30 | −5.9 | −13.4 | |
| 8:00 | −7.8 | −28.1 | |
| 8:30 | −12.2 | <−70.0[1] | |
| 9:00 | −17.3 | | |
| 9:30 | −23.6 | | |
| 10:00 | −33.1 | | |
| 10:30 | ≦−70.0[1] | | |

[1]Dew point measuring instrument would not read dewpoints below −70° C.

From Table III it can be seen that the azeotrope mixtures with ethanol or isopropanol dried faster than the methanol-water mixture. As shown, the isopropanol-water azeotrope mixture dried in about half the time required for the methanol-water mixture to dry.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of drying a pipeline containing water which is to transport a hydrate forming gaseous fluid comprising the steps of:

(a) flowing an azeotropic liquid which forms an azeotrope mixture with water into contact with said water in said pipeline, the amount of said azeotropic liquid being sufficient to form an azeotrope mixture with said water whereby as said mixture is evaporated in said pipeline, the water concentration in the remaining mixture does not approach that concentration which will form hydrates with said hydrate forming gaseous fluid; and then (b) flowing said hydrate forming gaseous fluid through said pipeline.

2. The method of claim 1 wherein said azeotropic liquid is an alcohol.

3. The method of claim 1 wherein said azeotropic liquid is an alcohol selected from the group consisting of ethanol, n-propanol, isopropanol, tert-butyl alcohol, isopropyl ether, ethyl acetate and methyl ethyl ketone.

4. The method of claim 1 wherein said azeotropic liquid is selected from the group consisting of ethanol, n-propanol, and isopropyl ether, and the azeotrope mixture remaining in said pipeline after step (a) contains in the range of from about 1% or less to about 5% water by weight of said mixture.

5. The method of claim 1 wherein said azeotropic liquid is caused to flow into contact with said water in said pipe-line in accordance with step (a) by at least one pipeline pig propelled by a stream of non-hydrate forming gas.

6. The method of claim 5 wherein said stream of non-hydrate forming gas is selected from the group consisting of air, nitrogen and process gases.

7. The method of claim 6 wherein said stream of non-hydrate forming gas is water absorbing.

8. The method of claim 1 wherein said hydrate forming gaseous fluid is natural gas.

9. The method of claim 8 wherein said azeotropic liquid is ethanol and the azeotrope mixture remaining in said pipeline after step (a) contains in the range of from about 1% or less to about 5% water by weight of said mixture.

10. The method of claim 9 wherein said azeotropic liquid is caused to flow into contact with said water in said pipeline by a plurality of separated pipeline pigs propelled by a stream of non-hydrate forming gas.

11. An improved method of drying a pipeline containing water which is to transport a hydrate forming gaseous fluid comprising the steps of:

(a) flowing an azeotropic liquid selected from the group consisting of ethanol, isopropanol and tert-butyl alcohol into contact with said water in said pipeline, the amount of said azeotropic liquid being sufficient to form an azeotrope mixture with said water whereby as said mixture is evaporated in said pipeline, the water concentration in the remaining mixture does not approach that concentration which will form hydrates with said hydrate forming gaseous fluid; and then (b) flowing said hydrate forming gaseous fluid through said pipeline.

12. The method of claim 11 wherein said amount of azeotropic liquid is such that the azeotrope mixture remaining in said pipeline after step (a) contains in the range of from about 1% or less to about 5% water by weight of said mixture.

13. The method of claim 12 wherein said azeotropic liquid is caused to flow into contact with said water in said pipeline in accordance with step (a) by at least one pipeline pig propelled by a stream of non-hydrate forming gas.

14. The method of claim 13 wherein said stream of non-hydrate forming gas is selected from the group consisting of air, nitrogen and process gases.

15. The method of claim 14 wherein said stream of non-hydrate forming gas is water absorbing.

16. The method of claim 15 wherein said hydrate forming gaseous fluid is natural gas.

17. An improved method of drying a pipeline containing water which is to transport a hydrate forming gaseous fluid comprising the steps of:

(a) flowing ethanol into contact with said water in said pipeline, the amount of said ethanol being such that the resulting mixture contains in the range of from about 1% or less to about 5% water by weight of said mixture; and then (b) flowing said hydrate forming gaseous fluid through said pipeline.

18. The method of claim 17 wherein said hydrate forming gaseous fluid is natural gas.

19. The method of claim 18 wherein said ethanol is caused to flow into contact with said water in said pipeline by a plurality of separated pipeline pigs propelled by a stream of non-hydrate forming gas.

20. The method of claim 19 wherein said stream of non-hydrate forming gas is water absorbing and is selected from the group consisting of air, nitrogen and process gases.

* * * * *